United States Patent [19]

Hashimoto et al.

[11] Patent Number: 4,998,034
[45] Date of Patent: Mar. 5, 1991

[54] LOW SPEED HIGH TORQUE MOTOR WITH PRODUCTION METHOD

[75] Inventors: Ichiro Hashimoto; Giichi Ishida; Koujirou Yamashita, all of Hitachi, Japan

[73] Assignee: Hitachi, Ltd., Tokyo, Japan

[21] Appl. No.: 413,730

[22] Filed: Sep. 28, 1989

[30] Foreign Application Priority Data

Oct. 5, 1988 [JP] Japan .................... 63-249865

[51] Int. Cl.⁵ .............. H02K 15/03; H02K 1/28; H01F 7/02
[52] U.S. Cl. .................... 310/67 R; 310/42; 310/156; 335/306
[58] Field of Search ............. 310/67 R, 42, 46, 156, 310/266; 335/220, 284, 285, 303, 306; 29/732

[56] References Cited

U.S. PATENT DOCUMENTS

| | | | |
|---|---|---|---|
| 3,710,291 | 1/1973 | Nicoud | 335/306 |
| 3,737,693 | 6/1973 | Mishima | 310/266 |
| 4,665,333 | 5/1987 | Heim et al. | 310/42 |
| 4,678,954 | 7/1987 | Takeda et al. | 310/156 |
| 4,687,961 | 8/1987 | Horber | 310/186 |

FOREIGN PATENT DOCUMENTS 59-185987 12/1984 Japan .

Primary Examiner—Steven L. Stephan
Assistant Examiner—Dennis Haszko
Attorney, Agent, or Firm—Antonelli, Terry, Stout & Kraus

[57] ABSTRACT

A cylindrical field system of a low speed high torque motor is divided in an axial direction into first and second field system portions, these two field system portions are connected by a connecting member and a field magnet is disposed between the field system portions so that particularly machine work can be made before fitting of the field magnet. Accordingly, chips can be removed easily by use of a simple device.

A cylindrical field system is divided in an axial direction into first and second field system portions, these field system portions are connected by a connecting member and cylindrical magnets fixed to a flexible belt-like fixture are wound on the field system portions between them so as to produce a rotor. Accordingly, the assembling property of the motor can be improved remarkably.

7 Claims, 2 Drawing Sheets

LOW SPEED HIGH TORQUE MOTOR WITH PRODUCTION METHOD

BACKGROUND OF THE INVENTION

The present invention is applied to a so-called "direct drive motor" which drives directly a robot or an office machine without using a reduction gear.

More particularly, in a low speed high torque motor, the present invention relates to an improved field system and its production method.

A heretofore known motor which generates high torque at a low rotating speed has teeth on a rotor and a stator, and a field magnet inside the rotor so as to utilize effectively the magnetic flux of the field magnet to obtain the large torque. The content of U.S. Pat. No. 4,687,961 and Japanese Utility Model Laid-Open No. 59-185987 (1984) also relates to a motor of this kind.

In the prior art as stated above, the field magnet is disposed in a field system of the rotor, and after the field magnet is installed in the field system of the rotor, the field magnet is magnetized by a magnetizer which is disposed outside of the rotor and generates magnetomotive force to the field magnet of the rotor in order to magnetize the magnet.

In case of using the field magnet which is already magnetized after the field magnet is installed in the field system of the rotor, machine work on the rotor must be conducted in order to keep a high field cutting accuracy of the rotor which makes a very small magnetic gap with the stator.

But the structure of the prior art described above involves the following problems.

(1) When external magnetization is effected after assembly, extremely great magnetomotive force must be generated in a magnetizer because the magnet to be magnetized and a magnetizing yoke are too much spaced apart from each other, and large-scale equipment is necessary. The production steps cannot be standardized uniformly because consistent external magnetization is not possible for the multi-layered type magnet.

(2) Though the use of a magnet magnetized in advance may be possible, machine work must be conducted after the insertion of the magnet because the gap between the rotor and the stator in this kind of motor is small. Therefore, removal of chips and fins is extremely difficult and working property is greatly lowered. Moreover, magnetic dust removing equipment is necessary in the work shop and it is a primitive method, manual dust removal by use of an adhesive tape has been conducted. But it is troublesome and wastes much time.

SUMMARY OF THE INVENTION

From the viewpoint of the problems described above, the present invention is directed to provide a low speed high torque motor which makes it easy to remove chips and fins at the time of machine work and which has an improved assembly property.

In a motor of the type which includes a housing 1 (see FIG. 3) molded integrally from aluminum die casting and a bearing support cylinder 2 at its center, a protective cylinder 3 around its outer circumference and a side plate portion 4 for integrally connecting one of the ends each to the bearing support cylinder 2 and the protective cylinder 3; a stator 7 pressure-fitted to the outer circumference of the bearing support cylinder 2 and consisting of a stator core 5 and a stator winding 6 wound on its slots; a bearing 8 fitted to the inside of the bearing support cylinder; a shaft 9 supported rotatably by the bearing 8; a cup-shaped rotor 10 fixed to the shaft 9; and a field magnet 12 disposed in a cylindrical field system 11 of the rotor 10 opposing the outer circumference of the stator core 5. The first object of the invention for making the chip and fin removing work easy is accomplished, by the structure wherein the cylindrical field system 11 (see FIG. 1) is divided in an axial direction into first and second field system portions 11A and 11B, the two field system portions 11A and 11B are connected by a connecting member 13 and the field magnet 12 which is inserted from outside of the field system portions 11A and 11B connected by the connecting member 13 is disposed in close contact with surfaces of field system portions 11A and 11B between thereof.

The second object of the present invention for making production easy is accomplished by the steps of dividing the cylindrical field system 11 in an axial direction into first and second field system portions 11A and 11B, connecting these two field system portions 11A and 11B by the connecting member 13 and wrapping cylindrical magnets 12A fixed to a flexible belt-like fixture 14 (see FIG. 2) around the field system portions 11A and 11B, respectively, to produce the rotor.

In the present invention, the cylindrical field system is divided in an axial direction and the field magnet 12 magnetized in advance is later inserted between the divided field systems. Accordingly, removal of chips, etc., produced by cutting of the field system is easy. Since each of the divided magnets is fixed to the flexible belt-like fixture and is wrapped around the field system, the working property can be improved.

BRIEF DESCRIPTION OF THE DRAWINGS

FIGS. 1 and 2 show an embodiment of the present invention, wherein:

FIG. 1 is a sectional half view of a rotor and is taken along the line 1—1 of FIG. 2; and FIG. 2 is a view showing a state of assembling of a field system of the rotor.

DESCRIPTION OF THE PREFERRED EMBODIMENTS

At first, the overall structure of a low speed high torque motor to which the present invention is applied suitably will be described schematically.

Figure 3:
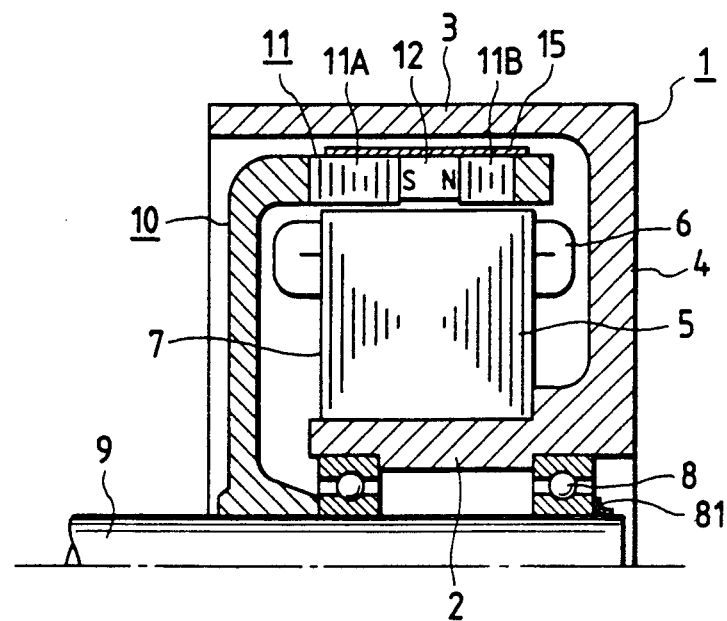
FIGS. 3 and 4 are schematic sectional half views of low speed high torque motors applying the present invention.

In FIG. 3, reference numeral 1 represents a housing molded aluminum die casting and formed with a bearing support cylinder 2 at its center and protective cylinder 3 around the outer circumference of the housing. Reference numeral 4 represents a side plate which connects integrally one of the ends of the bearing support cylinder 2 and that of the protective cylinder 3 and is molded by aluminum die casting in the same way as described above. Reference numeral 5 represents a stator core having a large number of teeth (not shown) formed around its outer circumference and 5 comprises a laminate member formed by laminating a plurality of silicon steel sheets and stator windings 6 are wound on the slots not shown in the drawings. The stator core 5 is fitted to the outside of the bearing support cylinder 2.

Reference numeral 8 represents a bearing such as a ball bearing fitted into the bearing support cylinder 2 and supporting rotatably a shaft 9. Reference numeral 81 represents a bearing pressor. Reference numeral 10 represents a rotor having a cup-like shape and provided with a cylindrical field system 11 around the outer circumference of the rotor. In the drawings, a field system having portions of the rotor 11A and 11B are disposed and a large number of teeth T (see FIG. 2) described later are formed on its inside. Reference numeral 12 represents a field magnet which is inserted between the field systems 11A and 11B. Reference numeral 15 represents a fastening ring which fastens tightly the field magnets 12 around the rotor 10.

Figure 4:
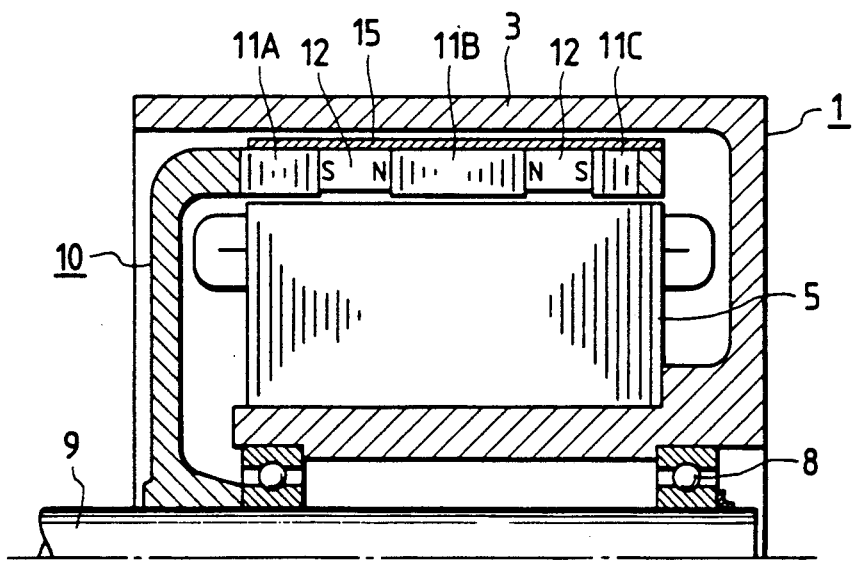

As structured above, the motor to which the present invention is applied, has the teeth on both the stator 7 and the rotor 10 and also reduces as much as possible the gap between them in order to obtain high torque. The gap is usually about 0.1 mm. The field magnet 12 is clamped by the rotor 10 and the resulting torque is determined by the product of the voltage induced by the magnetic flux from the magnet 12 in the stator coil and the current flowing through the coil. To obtain high torque without changing the diameter of the motor, the magnet must have a multi-layered structure as shown in FIG. 4 besides the mere increase in core thickness. Moreover, the magnetizing direction of the magnet is reversed.

Figure 1:
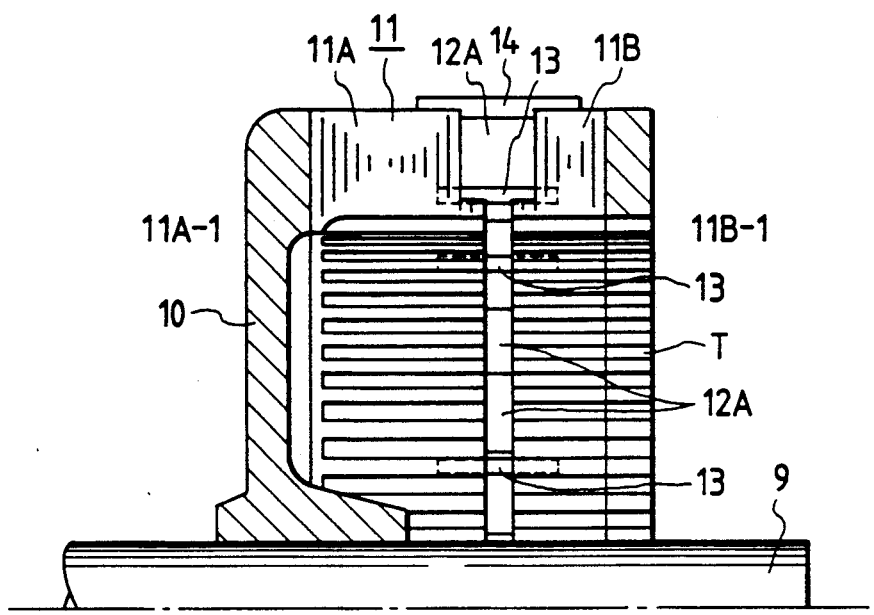
Figure 2:
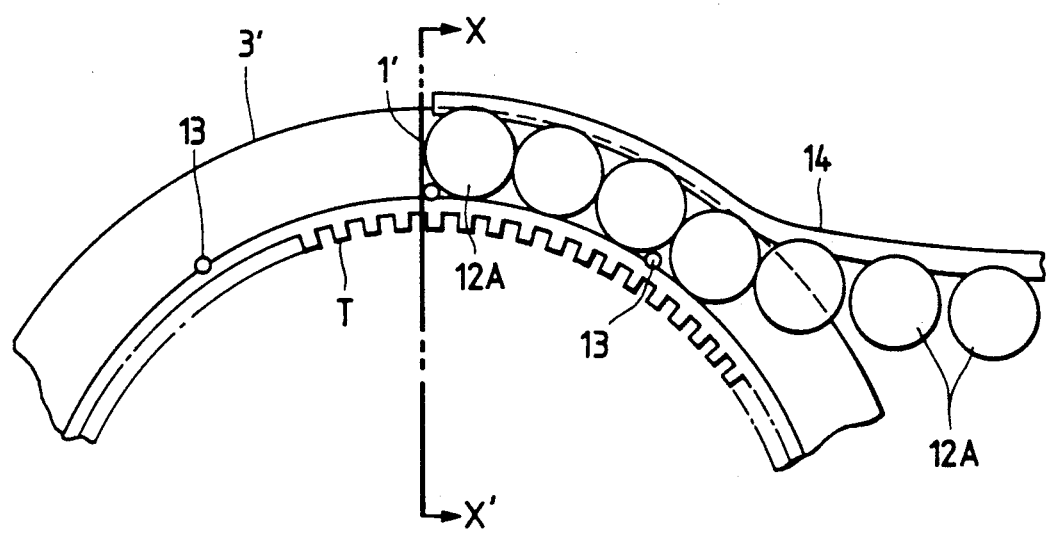

The feature of the present invention is in construction of a rotor shown in FIGS. 1 and 2 which is applied in the low speed high torque motor stated above.

Next, an embodiment of the present invention will be explained with reference to FIGS. 1 and 2. FIG. 1 shows construction of a rotor in which a field magnet is fitted and FIG. 2 shows a fitting method of the field magnet.

In FIG. 1, reference numeral 9 represents a shaft and reference numeral 10 shows a rotor fixed to the shaft 9. The rotor 10 is molded by aluminum die casting and a cylindrical field system 11 around its outer circumference consists of first and second field system portions 11A and 11B formed by laminating silicon steel sheets. A large number of teeth T are formed around the inner circumference.

Reference numeral 13 represents a connecting member that connects the first and second field system portions 11A and 11B to each other. The cylindrical connecting members 13 are split sheet-like connecting members or pin-like connecting members. FIG. 1 shows an example where ten pin-like connecting members 13 are used. These connecting members 13 are made of non-magnetic material.

In a motor of this kind, it is essentially necessary to reduce as much as possible the gap between the rotor and the stator in order to increase torque, and this is usually attained by machine-working the inner diameter of the field system 11. In accordance with the present invention, the inner diameter is worked under the state shown in FIG. 1, in other words, under the state that the field magnet is not yet fitted. Accordingly, chip and magnetic power are not magnetically attracted to the field system and their removal becomes extremely easy.

They can be removed easily by, for example, blowing compressed air on the field system. In accordance with the prior art technique, trimming (cutting) is effected under the state where the field magnet is assembled integrally on a cylindrical field system so that the chips and the like are strongly attracted magnetically. Since the removal of the chips is difficult, a large-scale apparatus for removing them is necessary. Furthermore, those chips and the like which cannot be removed by machines must be removed manually by use of an adhesive tape or the like.

In contrast, since the present invention applies the machine work before the field magnet is fitted, the removal of the chips and the like is extremely easy as described before and only a simple blower as necessary.

In the structure shown in FIG. 1, reference numeral 11A-1 represents a toroidal projection that projects toroidally from the edge of the inner circumference of the first field system portion 11A and reference numeral 11B-1 does a toroidal projection that projects toroidally from the edge of the inner circumference of the second field system portion 11B.

Next, a method of fitting a field magnet 12 to the cylindrical field system 11 having such a structure will be described.

In FIG. 2, the field magnet 12 is in advance split into columnar field magnets 12A, and fixed to a flexible belt-like fixture 14. A row of the columnar field magnets fixed to this belt-like fixture 14 is inserted from outside of the field system portions 11A and 11B and arranged in close contact with the surfaces of the first and second field system portions 11A and 11B between thereof. Since the columnar field magnets 12A are fixed at this time to the flexible belt-like fixture 14, they can be fitted as if they were wound around the cylindrical field system 11 and the fitting work becomes therefore extremely easy. Practically, the field magnets 12A, are bonded by adhesive to the toroidal projections in such a manner as to bridge the toroidal projections 11A-1, 11B-1 of the first and second field system portions 11A, 11B.

In this fixing work, the pins 13 described above serve as positioning members of the columnar field magnets 12A and prevent the movement of the magnets 12A in a circumferential direction. If the field magnet 12A is in advance fixed to the belt-like fixture 14 as described above, the fitting work to the cylindrical field system 11 becomes extremely easy.

If the belt-like fixture 14 is left after assembly, it serves also as a dust-proofing cover of the field 12A and prevents the field 12A from jumping out. Both ends of the belt-like fixture 14 are fixed to each other by bonding after winding.

Incidentally, the split field magnet 12A is columnar in the embodiment described above, it may be prismatic, elliptic or of any other shape. The field magnet 12A may be merely of two semicylinders.

In the case of the rotor of a multi-layered magnet as shown in FIG. 4, the field magnet may be fitted by merely reversing the magnetization direction and no particular magnetizing device is necessary.

Since the rotating speed of the motor of this kind is as low as 100 r.p.m., particular strong structural elements are not necessary for preventing centrifugal movement of the field magnet.

As described above, the invention of the present application is industrially very advantageous.

In accordance with the present invention described above, the cylindrical field system 11 is divided axially into the first and second field system portions 11A and 11B, these field system portions 11A and 11B are connected by the connecting member 13, and the field magnets 12A are disposed between the field system portions 11A and 11B so that machine work can be made easily before fitting of the field magnets 12A. Consequently, chips can be removed easily and only a simple device is necessary for this purpose.

Furthermore, the cylindrical field system 11 is divided in an axial direction into the first and second field system portions 11A and 11B, these two field system portions 11A and 11B are connected by the connecting member 13 and the cylindrical magnets 12A fixed to the flexible belt-like fixture 14 are wrapped around these field system portions so as to produce the rotor. Accordingly, assembling of the motor can be improved. When a plurality of field magnets 12A are magnetized and fixed to the flexible belt-like fixture 14 in advance, there can be obtained the field magnet suitable for improving the assembling property of the motor of this kind.

What is claimed is:

1. In a motor of the type which includes:
   a housing having a bearing support cylinder at its center, a protective cylinder around its outer circumference and a side plate portion for integrally connecting one end of said bearing support cylinder and one end of said protective cylinder;
   a stator pressure-fitted to the outer circumference of said bearing support cylinder and comprising of a stator core and a stator winding wound on slots in said stator core;
   a bearing fitted to the inside of said bearing support cylinder;
   a shaft supported rotatably by said bearing;
   a cup-shaped rotor fixed to said shaft; and
   a field magnet disposed in a cylindrical field system of said rotor opposing the outer circumference of said stator core, a low speed high torque motor characterized in that said cylindrical field system is divided in an axial direction into first and second field system portions, said two field system portions are connected by connecting member and said field magnet which is inserted from outside of said field system portions connected by said connecting member is disposed in close contact with surfaces of said field system portions.

2. The low speed high torque motor according to claim 1, wherein said connecting member comprises a plurality of pins.

3. The low speed high torque motor according to claim 1, wherein mutually projecting toroidal projections and are provided at the inner circumferential edges of said field system portions and, respectively, in such a manner as to support said field magnet.

4. The low speed high torque motor according to claim 1, wherein said field magnet is divided into a plurality of magnet portions.

5. The low speed high torque motor according to claim 1, wherein said field magnet is bonded to said field system portions and by adhesive.

6. The low speed high torque motor according to claim 2, wherein said field magnet is divided into a plurality of columnar magnets and said pins are disposed between said columnar magnets.

7. A method of producing a low speed high torque motor having:
   a housing with a bearing support cylinder at the center, a protective cylinder around the outer circumference of said housing and a side plate portion for integrally connecting one end of said bearing support cylinder to one end of said protective cylinder;
   a stator pressure-fitted to the outer circumference of said bearing support cylinder and comprising a stator core and a stator winding wound on slots in said stator core;
   a bearing fitted to the inside of said bearing support cylinder;
   a shaft supported rotatably by said bearing;
   a cup-shaped rotor fixed to said shaft; and
   a field magnet disposed in a cylindrical field system of said rotor opposing the outer circumference of said stator core;
   characterized by the steps of:
   dividing said cylindrical field system in an axial direction into first and second field system portions;
   connecting said two field system portions by a connecting member; and
   wrapping columnar magnets fixed to a flexible belt-like member around said field system portions in order to produce said rotor.

* * * * *